US012681627B2

(12) United States Patent
Sheu et al.

(10) Patent No.: US 12,681,627 B2
(45) Date of Patent: Jul. 14, 2026

(54) INFORMATION HANDLING SYSTEM DISPLAY PRIVACY GLASSES WITH TOUCH DETECTION FRAME

(71) Applicant: Dell Products L.P., Round Rock, TX (US)

(72) Inventors: Weijong Sheu, Austin, TX (US); Deeder M. Aurongzeb, Austin, TX (US); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/616,394

(22) Filed: Mar. 26, 2024

(65) Prior Publication Data

US 2025/0306744 A1     Oct. 2, 2025

(51) Int. Cl.
*G06F 3/04845* (2022.01)
*G02B 27/01* (2006.01)
*G06F 3/04812* (2022.01)
*G06F 3/0488* (2022.01)

(52) U.S. Cl.
CPC ....... *G06F 3/04845* (2013.01); *G02B 27/017* (2013.01); *G06F 3/04812* (2013.01); *G06F 3/0488* (2013.01); *G02B 2027/0178* (2013.01); *G06F 2203/04806* (2013.01)

(58) Field of Classification Search
CPC .............. G06F 3/04845; G06F 3/0488; G06F 3/04812; G06F 2203/04806; G02B 27/017; G02B 27/0178
See application file for complete search history.

(56) References Cited

U.S. PATENT DOCUMENTS

| | | | |
|---|---|---|---|
| 8,625,200 B2 | 1/2014 | Smith et al. | |
| 9,977,493 B2 | 5/2018 | Lanier et al. | |
| 10,852,839 B1 * | 12/2020 | Ravasz .................. | G06F 3/017 |
| 10,962,788 B2 | 3/2021 | Huo et al. | |
| 11,049,476 B2 | 6/2021 | Fuchs et al. | |
| 11,551,602 B2 | 1/2023 | Marsh et al. | |
| 12,079,903 B1 * | 9/2024 | Rivas Vetencourt ... | G06T 11/00 |
| 2013/0044042 A1 * | 2/2013 | Olsson .................... | G06F 3/017 |
| | | | 345/8 |
| 2015/0186033 A1 * | 7/2015 | Min ..................... | G02B 27/017 |
| | | | 345/173 |
| 2019/0107896 A1 * | 4/2019 | Stafford ................. | G06F 3/017 |
| 2019/0174088 A1 * | 6/2019 | Kim .................... | G06F 3/04886 |
| 2021/0011556 A1 | 1/2021 | Atlas et al. | |

* cited by examiner

*Primary Examiner* — Priyank J Shah

(74) *Attorney, Agent, or Firm* — Zagorin Cave LLP; Robert W. Holland

(57) ABSTRACT

An information handling system presents unsecure content at a display and secure content at privacy glasses worn by an end user overlapping the location where the secure content would be presented if a secure context allowed presentation at the display. A mouse cursor presented at the display supports interaction with both the unsecure content and the secure content through presentation at the display. The mouse cursor at the display is controllable by touch detection surfaces in the privacy glasses frame. Typed content is presented at the display when it inputs unsecure content and at the privacy glasses when it inputs secure content.

20 Claims, 11 Drawing Sheets

120 — PRIVACY MODE ENABLED IN LAPTOP AND BLUETOOTH SYNC TO GLASSES

124 — DATA PROCESSING AND NOISE ANALYSIS

126 — TAG PRIVACY ENABLED FILE

128 — CALCULATE TOUCH POINT 0.1MM CRUDE RESOLUTION

130 — TOUCH-POINT TRACKING

132 — ENABLE MOVEMENT

INFORMATION HANDLING SYSTEM DISPLAY PRIVACY GLASSES WITH TOUCH DETECTION FRAME

BACKGROUND OF THE INVENTION

Field of the Invention

The present invention relates in general to the field of information handling system displays, and more particularly to an information handling system display privacy glasses with touch detection frame.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One difficulty with portable information handling systems is that end users sometimes access confidential information in public locations, such as on airplanes or in coffee shops. The confidential information can include financial data, medical records, legal documents and work-related information. In some situations end users may view purely personal information that the end user does not want to see, such as emails or work presentations. Conventional ways to prevent third party viewing of sensitive information include privacy screen filters that narrow the field of view from which visual images at a display can be seen. An information handling system can simulate the effect of a privacy filter by turning off a display, minimizing the display window, reducing the display brightness, reducing the display contrast or similar measures. Although these measures may improve security, a determined third party can likely still make out the sensitive information. For instance, these measures often leave sensitive information presented at the display when an insecure environment is detected and before an application is executed that is associated with sensitive information. In some situations, maintaining the privacy of information is required by compliance regulations that require more than just a reduced risk of exposure of sensitive information.

SUMMARY OF THE INVENTION

Therefore, a need has arisen for a system and method which secures information presented at a display to viewing by only one primary end user viewer.

A further need exists for a system and method that supports end user interactions with displayed content through privacy glasses.

In accordance with the present invention, a system and method are provided which substantially reduce the disadvantages and problems associated with previous methods and systems securing information presented at a display from unauthorized viewing by third parties. Secure content is presented at a privacy glasses display over a main display presentation having unsecure content to appear as a unified presentation that has secure content only visible through the privacy glasses. Touch detection surfaces on the privacy glasses frame detect end user touch inputs to manage privacy glasses presentation and/or main display presentation.

More specifically, an information handling system processes information with a processor and memory disposed in a portable housing that includes a main display to present the information as visual images. When sensors of the information handling system detect an unsecure context, secure content is prohibited from presentation at the main display and instead presented at a privacy glasses display of privacy glasses worn by an end user. For example, a blank of a first color is presented at the main display and the secure content is presented in a second color as an overlay of the blank in the privacy glasses so that third parties cannot see the secure content. When a secure context is detected by the sensors, the secure content is returned to the main display for presentation. The privacy glasses include touch detection surfaces to detect end user touches as inputs to visual images presented at the main display and privacy glasses. For example, a first set to touches and/or gestures indicates inputs to the visual images presented at the privacy glasses and a second set of touches and/or gestures indicates inputs to the visual images at the main display and/or the composite presentation of both the main display and privacy glasses.

The present invention provides a number of important technical advantages. One example of an important technical advantage is that an enterprise can define privacy tags for information to ensure that the information is only presented in a secure manner when an information handling system is used in an unsecure context, such as a public location. When an end user attempts to view secure information in an unsecure context, a message is presented to the user to wear the privacy glasses to view the information. The visual images of the privacy glasses are presented as an overlay of the main display so that the composite image is presented to the end user as if viewed only with the main display. Touch detection surfaces on the frames of the privacy glasses offer an end user a ready interface to selectively interact with visual images presented at both the main display and the privacy glasses.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Privacy glasses present secure content of an information handling system when in an unsecure context, such as by overlaying the secure content on a main display presenting unsecure content. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
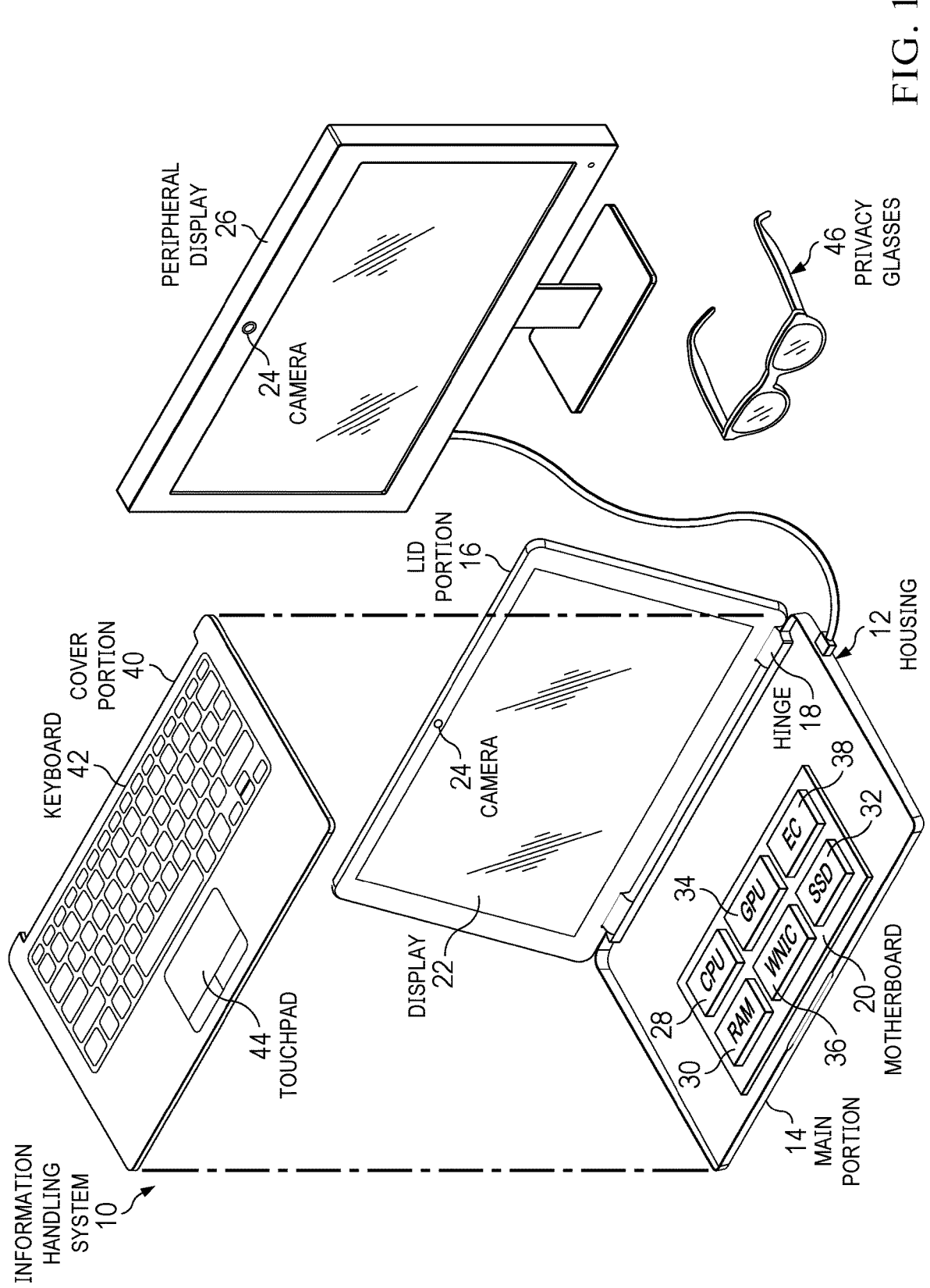
FIG. 1 depicts an information handling system that presents visual images as a composite of unsecure information at a main display and secure information at privacy glasses.

Referring now to FIG. 1, an information handling system 10 is depicted that presents visual images as a composite of unsecure information at a main display and secure information at privacy glasses 46. In the example embodiment, information handling system 10 is built in a portable housing 12 having a main portion 14 and lid portion 16 rotationally coupled by a hinge 18. The portable housing supports mobile operations that can take place in a variety of security contexts where processing components coupled to a motherboard 20 cooperate to process information for presentation as visual images at a display 22 coupled in lid portion 16. In the example embodiment, the processing components include a central processing unit (CPU) 28 that executes instructions to process information in cooperation with a random access memory (RAM) 30 that stores the instructions and information. A solid state drive (SSD) 32 includes non-transitory memory, such as flash memory, that provides persistent storage of instructions and information, such as an operating system and applications that execute on CPU 28. A graphics processing unit (GPU) 34 further processes information to generate the visual images, such as by generating pixel values for presentation at display 22. A wireless network interface controller (WNIC) 36 supports wireless communication with external networks and devices, such as by WIFI and BLUETOOTH. An embedded controller 38 manages operating conditions within portable housing 12, such as application of power to the processing components and maintenance of thermal constraints. Embedded controller 38 also manages interactions with input/output devices, such as a keyboard 42 and touchpad 44 coupled to a housing cover portion disposed over housing main portion 14.

In operation, information handling system 10 processes information to present visual images as output at an integrated display 22 and/or a peripheral display 26. A camera 24 included with the display captures visual images of a viewing area for the display to detect and identify end users viewing the visual images presented at the display. When a third party is detected in a viewing position of the main display, secure information presented at the main display may be compromised. The risk of a compromise can depend on a number of factors, such as a location of the information handling system in a secure or insecure context. For example, within an enterprise facility having only authorized employees the risk of compromise of secure information is decreased relative to a public location, such as an airport. When the context of the operating conditions of the information handling system indicate an insecure context, secure content presented at a main display is removed to privacy glasses 46 for presentation to an end user that is not viewable by others. In various embodiments, a variety of sensors may be used to determine context, such as end user identification by cameras, system location by GPS and/or WIFI, peripheral devices interfaced with the information and other indications of information security. For an end user wearing privacy glasses 46, moving between a presentation of visual images at a main display and a composite presentation that includes a privacy glasses presentation overlay to the main display seamlessly manages information security with minimal impact on interactions, as is described in greater detail below.

Privacy glasses 46 includes a transmissive display integrated in the glasses lens to present visual images with augmented reality (AR) so that an end user has visual privacy to view secure information with only the viewer able to see the secure portion of the visual image. The transmissive display may be translucent, LCD, microLED, OLED or other types of displays that support AR viewing of content and background. Secure information is kept private while AR viewing of unsecure information at a main display enhances the end user visual experience. Third parties might notice visual images presented at the privacy glasses, however, the size of the image and a translucent treatment on the glass lens will prevent viewing of the visual images. As an example, privacy glasses 46 include an LCD panel to present visual images as an extension of the primary display that is connected by a wireless interface or a cable tether, such as USB Type C. In the example embodiment, privacy glasses 46 have form factor and feel similar to regular eyeglasses with a micro-LED display that provides an unobstructed view of a main display and does not interfere with the end user's vision on regular activities. An application stored in SSD 32 and executed on CPU 28 separates secure information from unsecure information, such as with security tags associated with the information or applications, and presents the secure information at privacy glasses 46 as an overlay to a main display. Some examples of secure information protected by presentation at privacy glasses 46 include government classified documents, medical documents, business documents and signature documents. The secure presentation can focus on just the secure information or can focus on all information associated with defined applications executing on CPU 28. Sensor of privacy glasses 46 and information handling system 10 monitor security context to identify intruders in the proximity and automatically switch the privacy level depending on the security context, end user preferences, applications in use, physical location, etc. . . . .

In some instances, separation of secure content and insecure content may involve multiple levels of security and different types of separations, such as with a scale from zero to one hundred. The security context is then a rating, such as from zero to one hundred, that scales privacy based upon the level of security. For instance, in a home office only the most sensitive information will be made private while in a public place less sensitive information can be made private. In some instances a measurement of sensitivity might be difficult to rate, such as when a presentation is created that has slides in picture mode so that the nature of the graphic image is uncertain or cannot be decomposed. The scale of privacy applied to such images might leave the images depicted in home office and private in a public place even though the exact nature of the visual images is uncertain. Although the example embodiment relies upon a processor to sort out the security level of the visual images, a graphics processor may be used instead, such as by applying a first security level at the definition of a visual image by the CPU and a second security level at the creation of the visual image by the GPU.

Figure 2:
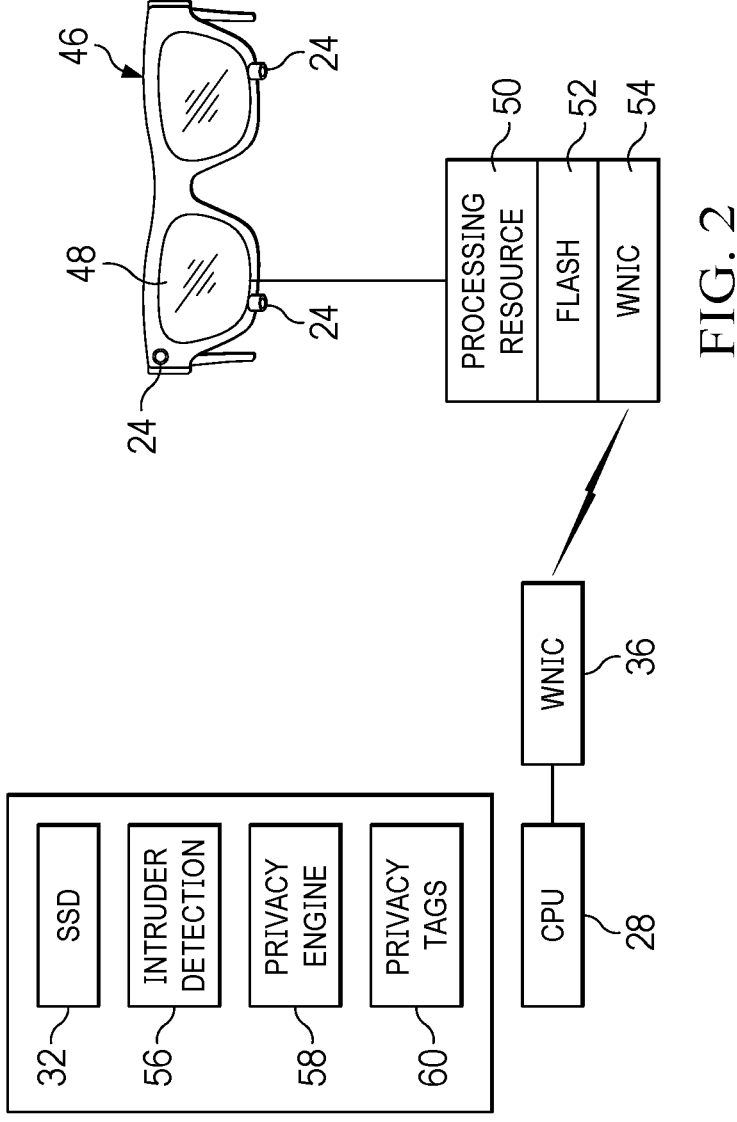
FIG. 2 depicts a block diagram of logical elements to manage presentation of visual images as a composite of a main display and a privacy glasses display.

Referring now to FIG. 2, a block diagram depicts logical elements to manage presentation of visual images as a composite of a main display and a privacy glasses display. In the example embodiment, CPU 28 communicates through WNIC 36 to provide visual images for presentation at privacy glasses 46. CPU 28 executes instructions stored in SSD 32 that manage selection of visual images for presentation at the privacy glasses versus a main display. An intruder detection module 56 executes instructions to determine a security context in which visual images are moved between the privacy glasses and main display. For example, a location is determined based upon a WLAN detected by WNIC 36 and the presence of a third person is detected with visual images captured by a camera 24. A privacy engine 58 selects which portions of a visual image are presented at a main display and a glasses display 48 when secure information is selected for presentation in an insecure context. Privacy tags 60 appended to files identify a security level for information that is selected for presentation that privacy engine 58 references to determine how to separate visual images for presentation. Privacy glasses 46 has a processing resource 50, such as an MCU, a flash memory 52 to store instructions and a WNIC 54 to communicate with WNIC 36. A front facing camera 24 captures visual images of a main display viewed by an end user through the privacy glasses to establish a relationship between the viewer head relative to the main display and to help align main display and privacy glasses content, such as with an overlap of the privacy glasses display content at a location where the content would be shown on the main display. A smoky front lens reduces outside image viewing to prevent leakage of sensitive visual images. Basic image display replication of an image source through an extension or duplication setting is applied to present secure information at glasses display 48. In one example embodiment, privacy glasses 46 act only as a display that kicks in presentation of secure visual images as needed. In an alternative embodiment described in greater detail below an end user touch detection surface interface is available. In the example embodiment, privacy glasses 46 also includes downward directed cameras 24 aligned to capture visual images of an end user's hands to identify finger gestures to operate the main and privacy glasses displays, such as a left hand gesture for the main display and a right hand gesture for the privacy glasses display.

Figure 3:
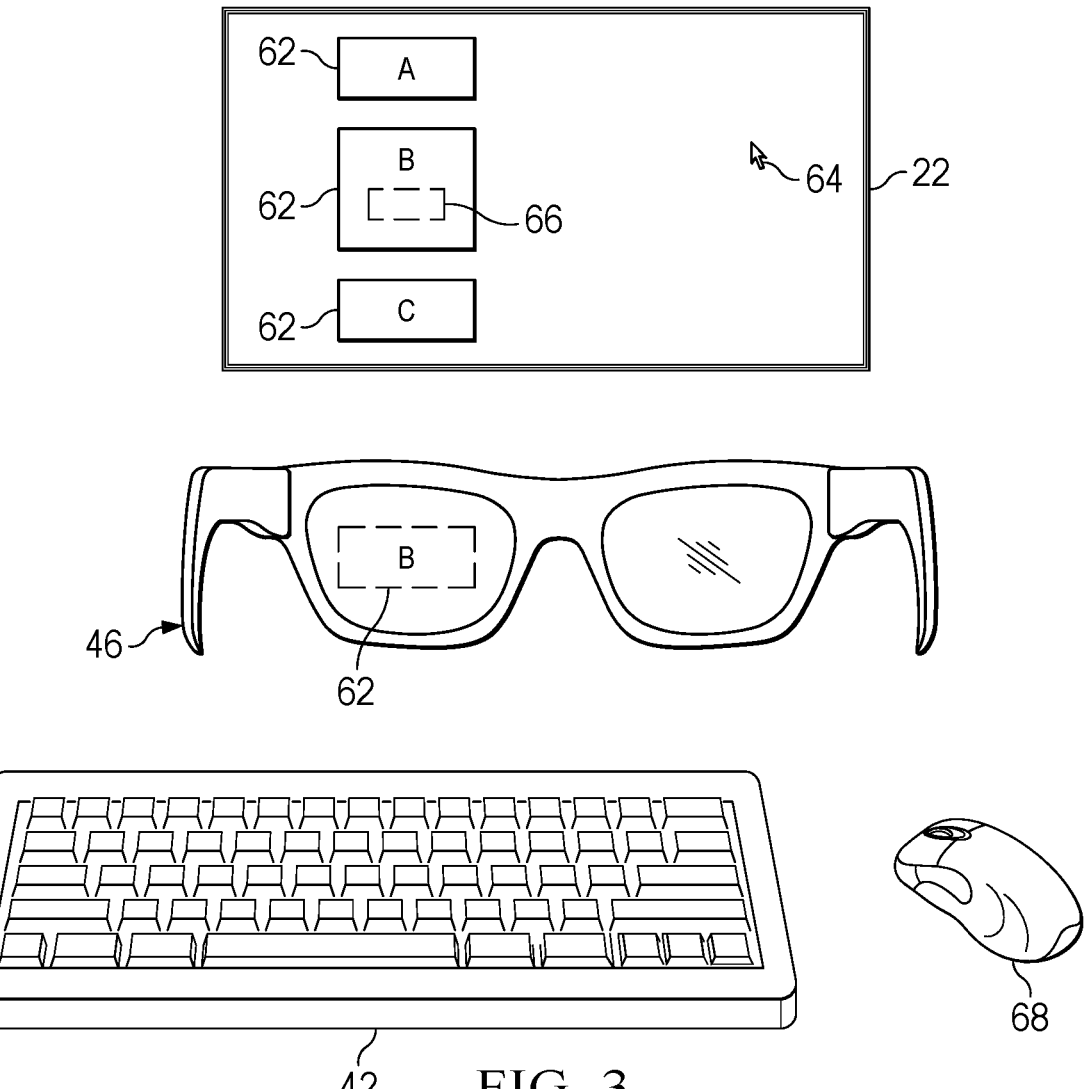
FIG. 3 depicts an example of a composite display presentation with secure and unsecure information.

Referring now to FIG. 3, an example of a composite display presentation with secure and unsecure information is depicted. In the example embodiment, a display 22 acts as the main display that presents content 62 labeled as A, B and C. An end user interacts with the content through a keyboard 42 that inputs keyed values into an input field 66 and a mouse 68 that moves a cursor 64 and accepts enter clicks associated with the position of cursor 64. In a secure context, all content 62 is presented at the main display in a conventional manner. When an insecure context is detected, insecure content remains at display 22 while secure content is removed from display 22 and presented at privacy glasses 46 instead. In the example embodiment, content B with input field 66 is secure content that is removed from display 22 and presented at privacy glasses 46 in a position that overlays where the content was on display 22. The position for the overlay may be determined with a camera in privacy glasses 46, which can be aided in determining the location by having a block with a first color presented at the location at display 22. In one embodiment, the block presented at the location of content B at display 22 has a color that is selected to contrast against a color for presentation of content B at privacy glasses 46. Cursor 64 is presented only at the main display with interactions to content of the privacy glasses determined by the positional overlay. Keyed inputs are put into input field 66 based upon which of the main display or privacy glasses is presenting the input field. In the example embodiment, when a block of the first color is depicted at the main display, the end user is effectively given notice of the need to put on the privacy glasses to view secure visual images. Alternatively, a message may be presented at the main display to request that the end user put on the privacy glasses to view secure content. In another example embodiment, the colors used for the main and privacy glasses displays may indicate a location of a detected intrude relative to the privacy glasses front, such as red for right and lavender for left when the intruder is +−45 degrees or on the periphery of the privacy glasses. The location of the intruder may be used for image processing of the content, such as determining which content to hide, and to adjust the privacy glasses front transparency level, such as darkening the privacy glasses lens when an intruder is more likely to see images on the privacy glasses display through the lens. In a crowded area with multiple intruders, an assumption may be applied that one is in a front position to darken the lens.

Figure 4:
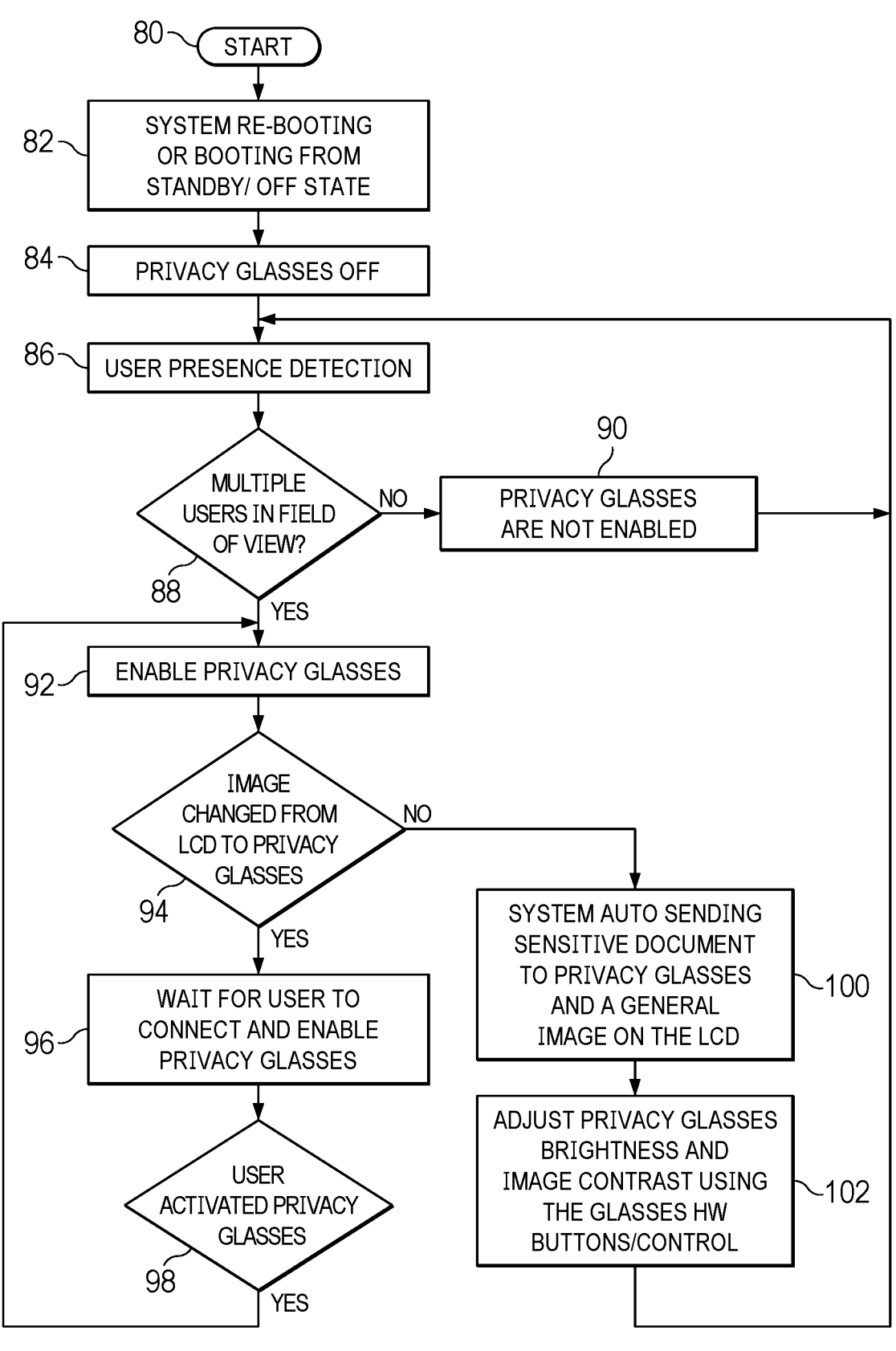
FIG. 4 depicts a flow diagram of a process for controlling presentation of secure information at an information handling system.

Referring now to FIG. 4, a flow diagram depicts a process for controlling presentation of secure information at an information handling system. The process starts at step 80 with power applied to the system and at step 82 system reboots or powers up from an off state to an on state. At step 84 the privacy glasses are in an off position not worn by an end user. At step 86 user presence is detected at the system, such as with an infrared user presence detection sensor. At step 88 a determination is made of whether multiple users are in the presence detection field of view. If not, the process continues to step 90 to leave the privacy glasses unenabled and to step 86 to continue monitoring for multiple end users. If multiple end users are detected at step 88, the process continues to step 92 to enable the privacy glasses by separating secure information from insecure information, removing the secure information from the main display, and presenting the secure information at the privacy glasses. At step 94 a determination is made of whether the visual image of the secure information is presented at the privacy glasses. If not the process continues to step 96 to wait for the end user to connect with the privacy glasses. At step 98 a determination is made of whether the end user has connected, after which the process returns to step 92 to present the secure information at the privacy glasses. At step 94, once the secure information is presented at the privacy glasses, the process continues to step 100 where the information handling system automatically sends all secure information to the privacy glasses for presentation while retaining insecure information for presentation at the main display. At step 102 an end user adjusts the presentation brightness and contrast to comfortably view the secure content overlay to the insecure content. The process then returns to step 86 to continue presentation of secure information at the privacy glasses until only the primary end user is present at the main display.

Figure 5A:
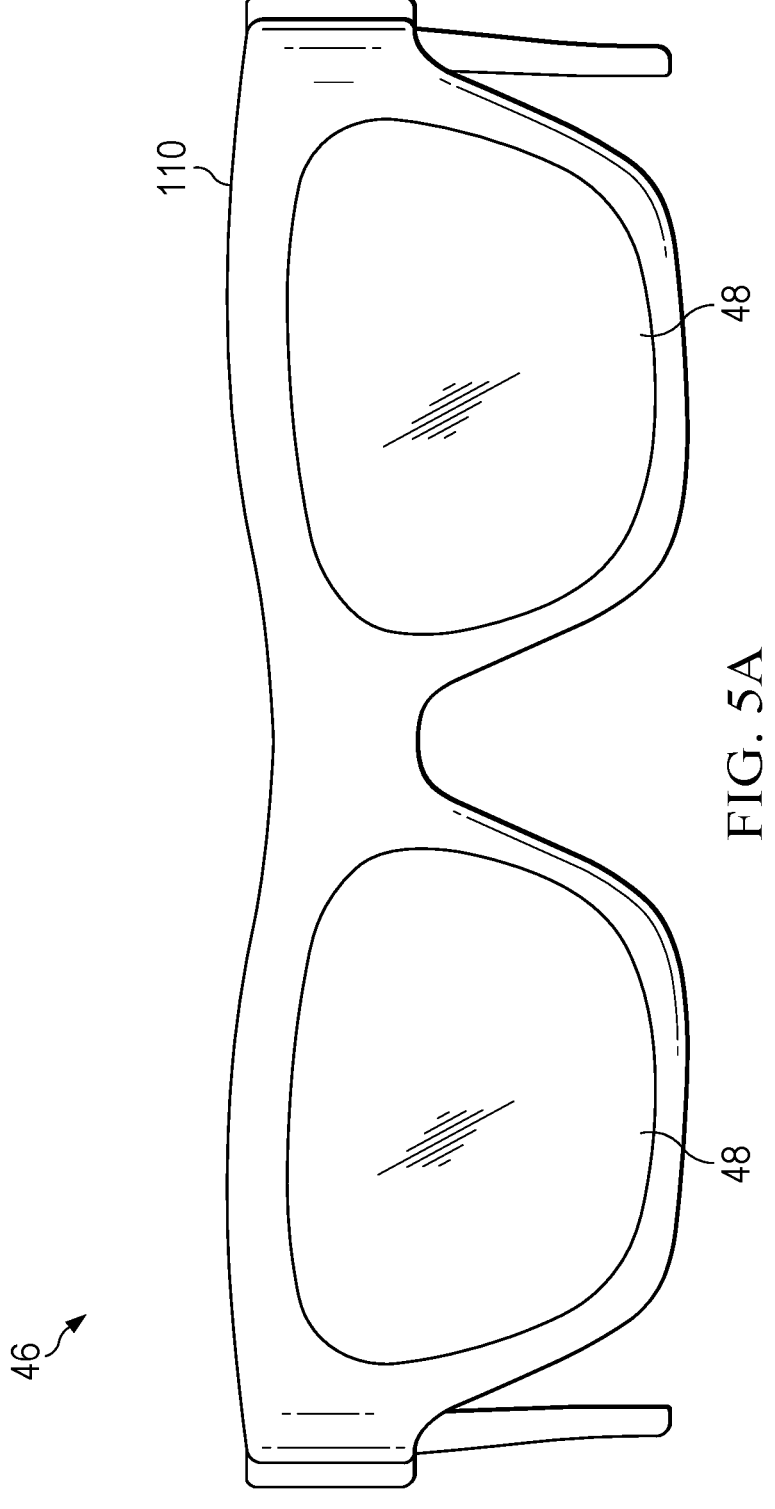
FIGS. 5A, 5B, 5C, 5D and 5E depict privacy glasses with touch detection surfaces to accept end user interactions with secure and insecure content.
Figure 5B:
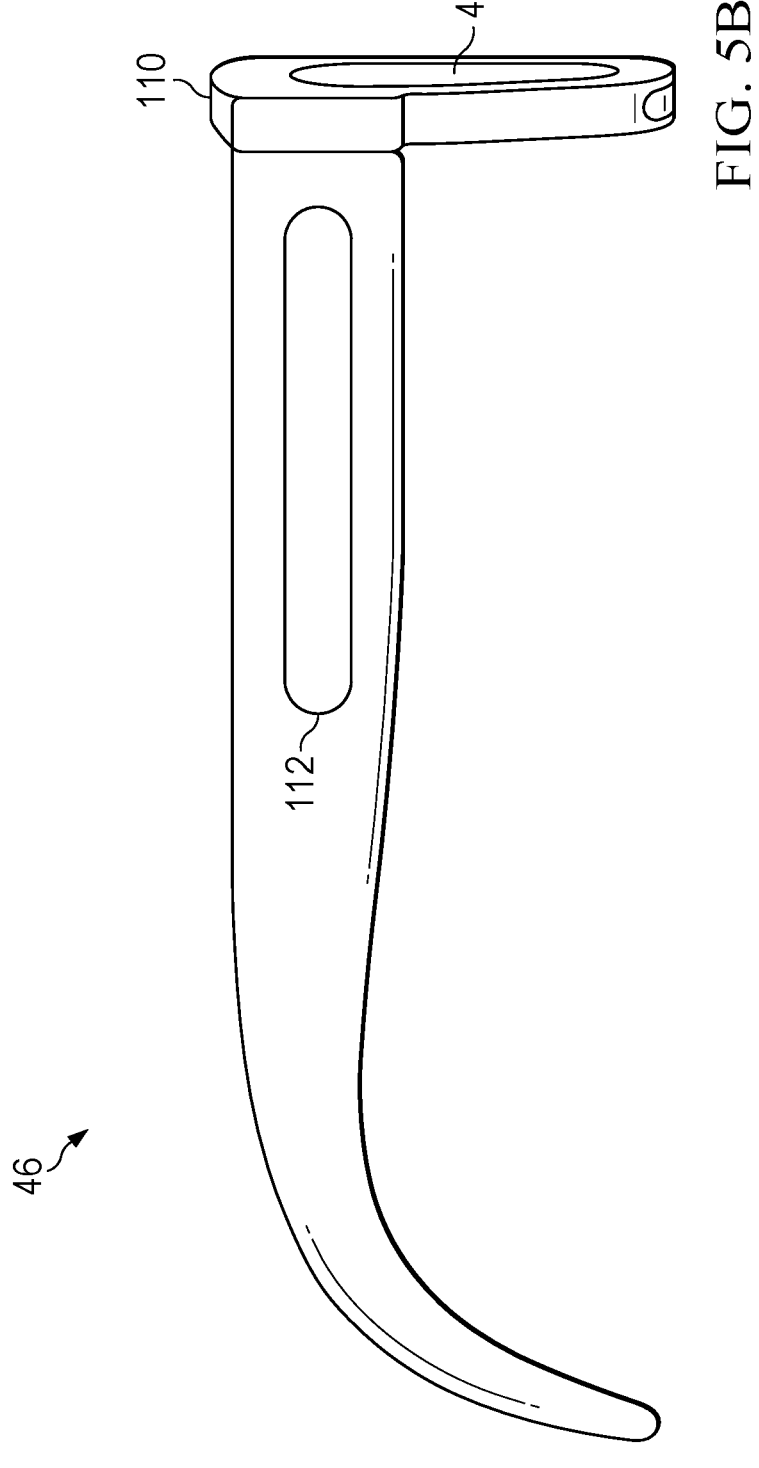
Figure 5C:
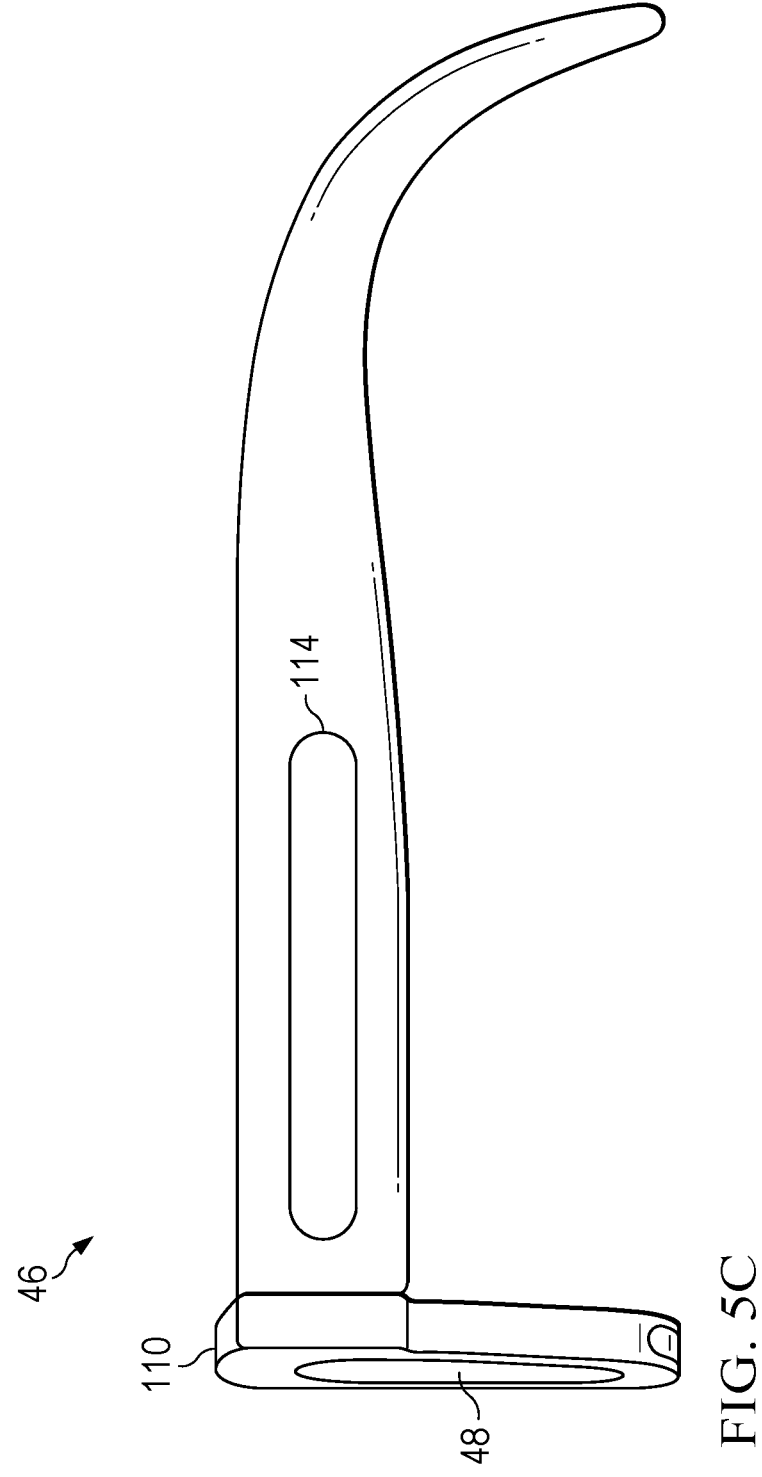
Figure 5D:
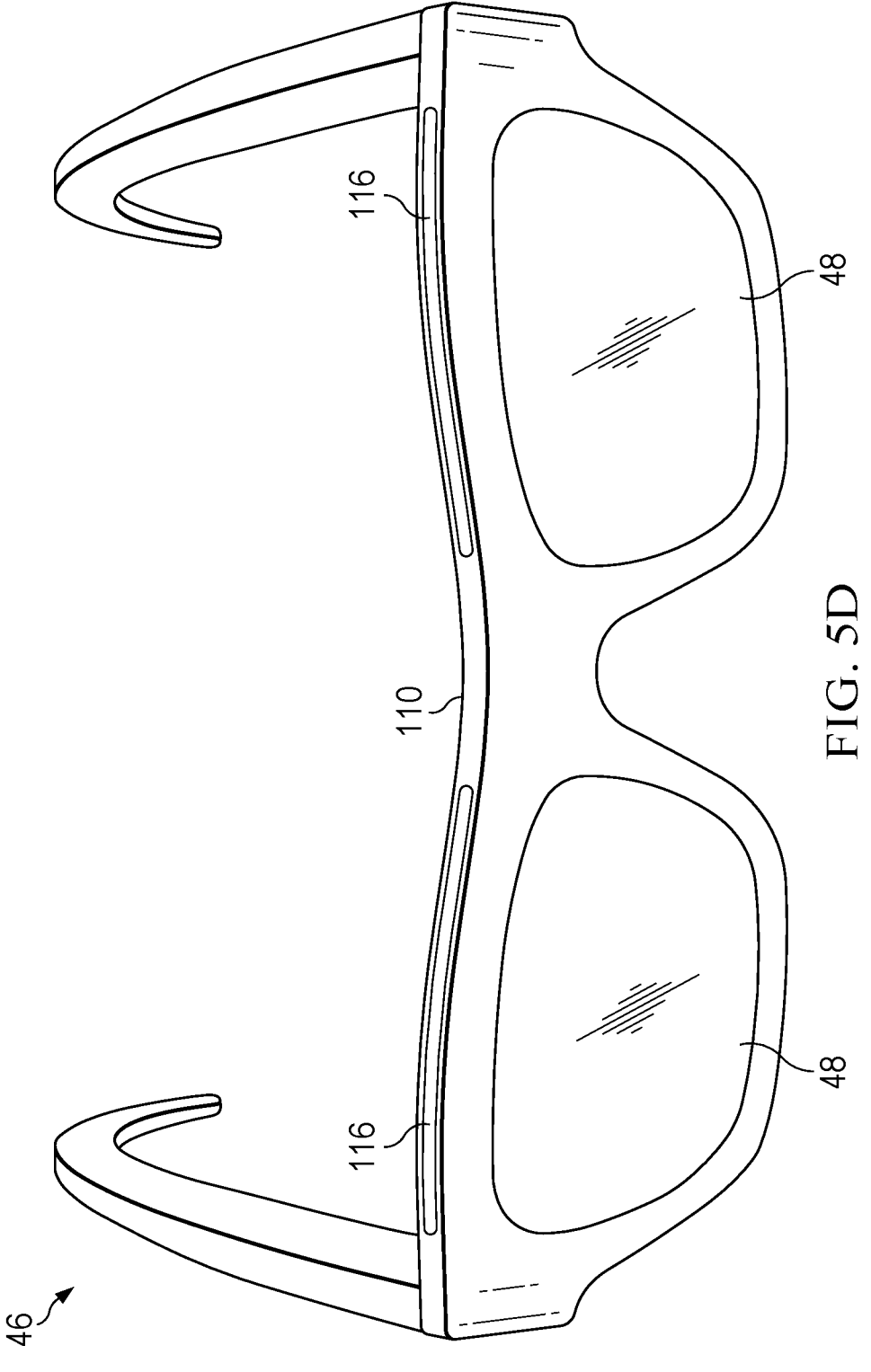
Figure 5E:
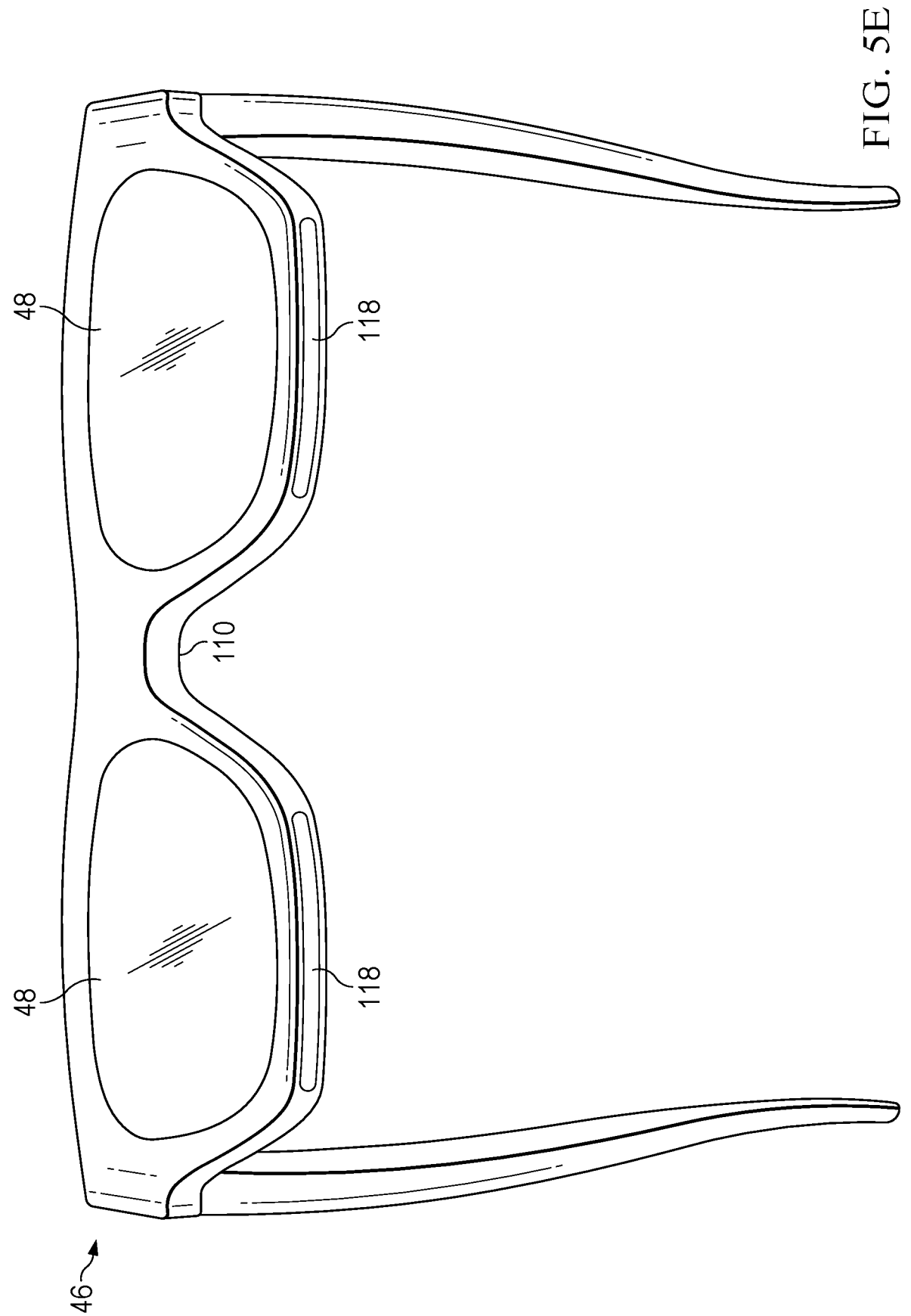

Referring now to FIGS. 5A, 5B, 5C, 5D and 5E, privacy glasses are depicted with touch detection surfaces to accept end user interactions with secure and insecure content. FIG. 5A depict a front view of privacy glasses 46 with displays 48 included in the glass lens and held in place by a frame 110. FIG. 5B depicts a right side view having a touch detection surface 112 extending back perpendicular to the display. FIG. 5C depicts a left side view having a touch detection surface 114 extending back perpendicular to the display. FIG. 5D depicts an upper view showing a top touch detection surface 116 located on the frame above each of the display lens. FIG. 5E depicts a lower touch detection surface 118 located on the frame below each of the display lens. Each of the touch detection surfaces 112, 114, 116 and 118 accept touch inputs including gestures to manage inputs to the information handling system based upon the presentation of visual images at the main and privacy glasses displays. In one example embodiment, a single finger touch is interpreted as an input to the visual images at the privacy glasses and a two finger touch is interpreted as an input to the main display, or vice versa. Touches may control a mouse cursor position or a tap for a mouse input. Some example inputs include a two finger slide on the right perpendicular surface to adjust brightness up and down. A quick two finger swipe can command a fast app scrolling forward or backward. Another example input is a one finger swipe on the right side to command fast forward or backward of a video and a one finger swipe on the left side to command a volume up or down. In one example embodiment, a one finger swipe controls video on the privacy glasses and a two finger swipe controls video on the main display. Another example input is a tap gesture that tethers and untethers the display location on the privacy glasses to the location of the main display so that the end user can view the information as a composite image or let the secure visual image portion stay in view when not viewing the main display. Another example input is a zoom in and zoom out commanded by the parallel upper and lower touch detections surfaces. For example, a finger on the top surface and another on the bottom surface, such as an index finger and thumb, moved in a clockwise direction zoom in and in a counterclockwise direction zoom out. The zoom gesture on the right side lens commands the privacy glasses visual image zoom in and out while a zoom gesture on the left side lens commands the main display zoom in and out. In various embodiments other types of touch inputs and gestures may be used to adjust only one of the privacy glasses and main display visual images or both.

Figure 6:
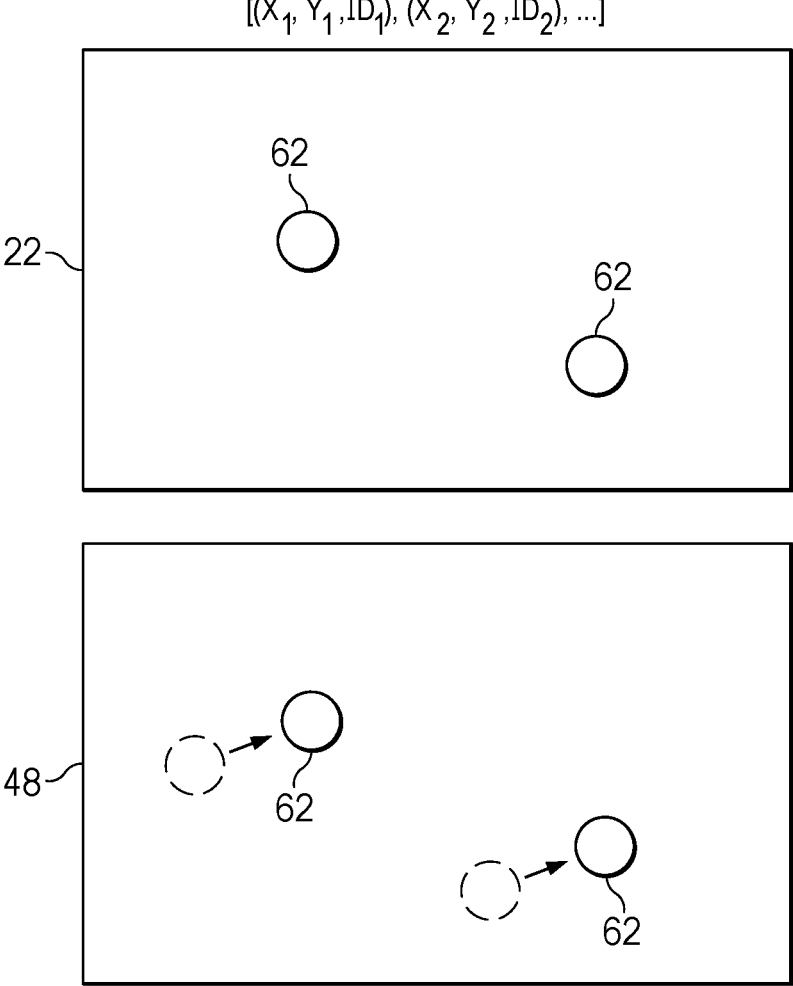
FIG. 6 depicts an example presentation of visual images and interactions with touches at the main display and privacy glasses.

Referring now to FIG. 6, an example presentation of visual images depicts interactions with touches at the main display and privacy glasses. Content 62 is presented at main display 22, shown in the example embodiment as dots. A position for the content 62 is determined from a crude resolution of the main display translated to the privacy glasses. Once the position for the content is determined the content is moved to the location. By using a two point touch segment for a rendered visual image with one point on a top and the other on a side, the entire visual image can be shifted with reduced calculations, such as to keep the secure content aligned with layout position relative to the unsecure content on the main display.

Figure 7:
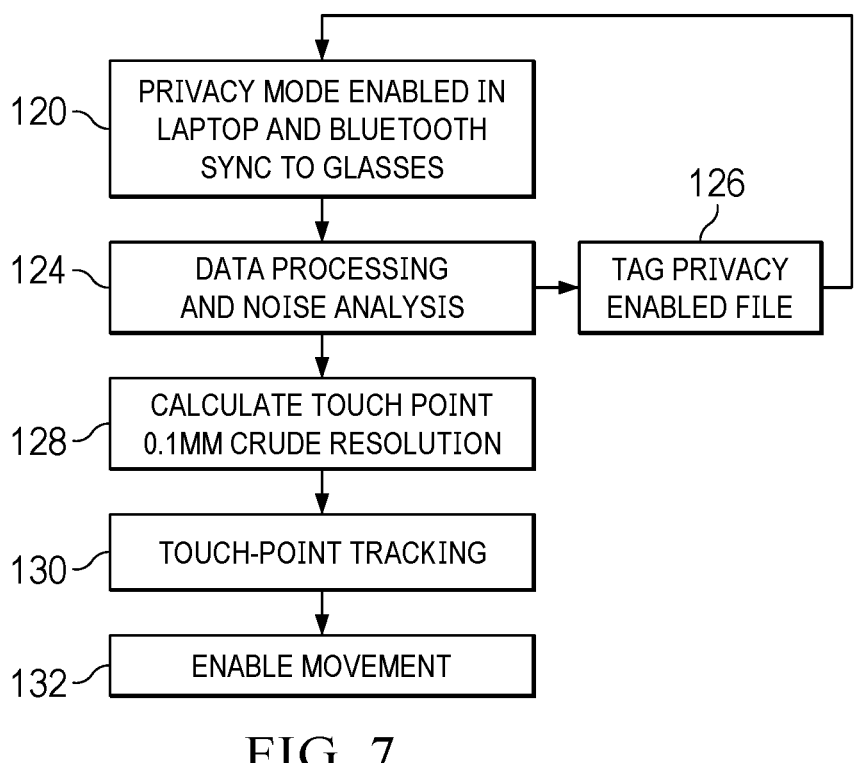
FIG. 7 depicts a flow diagram of a process for touch synchronization at a main display and privacy glasses.

Referring now to FIG. 7, a flow diagram depicts a process for touch synchronization at a main display and privacy glasses. The process starts at step 120 with a privacy mode enabled in a portable information handling system and BLUETOOTH synchronization to privacy glass to present secure visual images. At step 124 data processing is performed with noise analysis to separate out secure information, such as by sorting tag privacy enabled files 126 to detect the secure status of the information. At step 128 a calculation is performed of a touch point at 0.1 mm crude resolution for synchronization of visual image position at the privacy glasses based on the position at the main display. At step 130 touch-point tracking is performed for the positions to determine the new position of a visual image at the privacy glass. At step 132 the visual image movement is performed at the privacy glass.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor coupled in the housing and operable to execute instructions to process information;

a memory coupled in the housing and interfaced with the processor, the memory operable to store the instructions and information;

a main display coupled in the housing and interfaced with the processer, the main display operable to present the information as visual images;

a wireless network interface controller coupled to the housing and interfaced with the processor, the wireless network interface controller operable to communicate information with wireless signals;

a persistent storage device having non-transitory memory;

privacy glasses separate from the housing and having a frame coupling a glasses display to align with an end user's eyes when worn on an end user face, the privacy glasses interfaced with the processor and operable to present the information as visual images, the frame having a first set of opposing touch detection surfaces perpendicular to the glasses display and a second set of touch detection surfaces parallel to the glasses display; and instructions stored in the non-transitory memory that when executed cause:

presentation of a portion of the visual images at the glasses display instead of the main display, the portion of the visual images presented at the glasses display to overlap visual images of the main display;

detection of a first set of touch inputs at the touch detection surfaces to adjust visual images at only the glasses display; and detection of a second set of touch inputs at the touch detection surface to adjust visual images at the main display;

wherein at least one of the first set of touch inputs and the second set of touch inputs is detected by a one finger touch and the other of the first set of touch inputs is detected by plural finger touch.

2. The information handling system of claim 1 wherein the instructions further cause:

presentation of a mouse cursor only at the main display; and control of movement of the mouse cursor with touches at the frame touch detection surfaces to make an input at the portion of the visual images of the glasses display.

3. The information handling system of claim 1 wherein:

one finger touches are applied as the first set of touches; and two finger touches are applied as the second set of touches.

4. The information handling system of claim 1 wherein:

one finger touches are applied as the second set of touches; and two finger touches are applied as the first set of touches.

5. The information handling system of claim 1 wherein the first set of touches comprises:

a first finger on a first parallel touch detection surface;

a second finger on a second parallel touch detection surface;

movement of the first and second fingers in a first direction to zoom only the glasses display visual image portion in; and movement of the first and second fingers in a second direction to zoom only the glasses display visual image portion out.

6. The information handling system of claim 5 wherein:

the zoom in and the zoom out are commanded only to the visual image portion presented at the glasses display when only one finger is on the first parallel touch detection surface and only one finger is on the second parallel touch detection surface; and the zoom in and the zoom out are commanded to visual images at both the main display and the glasses display when plural fingers are on either of the first or second parallel touch detection surface.

7. The information handling system of claim 1 wherein the first set of touches comprises:

a first gesture to command the portion of the visual image presented on the glasses display to align with an overlap position of the main display as the privacy glasses move relative to the main display; and a second gesture to command the portion of visual images presented on the glasses display to untether from the position of the main display.

8. The information handling system of claim 1 wherein:

the first set of touch inputs comprises a slide with one finger on the perpendicular touch detection surface to change glasses display brightness; and the second set of touch inputs comprises a slide with two fingers on the perpendicular touch detection surface change both the main display and the glasses display brightness.

9. The information handling system of claim 1 wherein:

the first set of touch inputs comprises a slide with one finger on the perpendicular touch detection surface to adjust video playback presented at the glasses display; and the second set of touch inputs comprises a slide with two fingers on the perpendicular touch detection surface to adjust video playback presented at the main display.

10. A method for presenting information as visual images by an information handling system, the method comprising:

presenting visual images at a main display;

presenting of a portion of the visual images at a glasses display included in privacy glasses configured to wear by an end user, the portion presented instead of presentation at the main display, the portion of the visual images presented at the glasses display to overlap visual images of the main display at a location where the portion of the visual images was presented at the main display;

detecting of a first set of touch inputs at touch detection surfaces included in a frame of the privacy glasses to adjust visual images at only the glasses display; and detecting of a second set of touch inputs at the touch detection surfaces to adjust visual images at the main display;

wherein at least one of the first set of touch inputs and the second set of touch inputs is detected by a one finger touch and the other of the first set of touch inputs is detected by plural finger touch.

11. The method of claim 10 further comprising:

presenting of a mouse cursor only at the main display; and controlling of movement of the mouse cursor with touches at the frame touch detection surfaces to make an input at the portion of the visual images of the glasses display with the mouse cursor seen through the first portion of the visual images.

12. The method of claim 10 wherein:

one finger touches are applied as the first set of touches; and two finger touches are applied as the second set of touches.

13. The method of claim 10 wherein the first set of touches comprises:

a first finger on a first parallel touch detection surface that is parallel with the glasses display;

a second finger on a second parallel touch detection surface that is parallel with the glasses display;

movement of the first and second fingers in a first direction to zoom only the glasses display visual image portion in; and movement of the first and second fingers in a second direction to zoom only the glasses display visual image portion out.

14. The method of claim 13 wherein:

the zoom in and the zoom out are commanded only to the visual image portion presented at the glasses display when only one finger is on the first parallel touch detection surface and only one finger is on the second parallel touch detection surface; and the zoom in and the zoom out are commanded to visual images at both the main display and the glasses display when plural fingers are on either of the first or second parallel touch detection surface.

15. The method of claim 10 further comprising:

presenting a block of a first color at the main display; and presenting the portion of the visual images at the privacy glasses with a second color that contrasts against the first color.

16. The method of claim 10 wherein the first set of touch inputs comprises:

a first gesture to command the portion of the visual image presented on the glasses display to align with an overlap position of the main display as the privacy glasses move relative to the main display; and a second gesture to command the portion of visual images presented on the glasses display to untether from the position of the main display.

17. A system for presenting information as visual images by an information handling system, the system comprising:

a main display operable to present information as visual images;

privacy glasses operable to fit over an end user's eyes and operable to present information as visual images; and a non-transitory memory storing instructions that when executed on a processor cause:

presenting of a portion of the visual images at the privacy glasses, the portion presented instead of presentation at the main display, the portion of the visual images presented at the privacy glasses to overlap visual images of the main display at a location where the portion of the visual images was presented at the main display;

detecting of a first set of touch inputs at touch detection surfaces included in a frame of the privacy glasses to adjust visual images at only the privacy glasses; and detecting of a second set of touch inputs at the touch detection surfaces to adjust visual images at the main display;

wherein at least one of the first set of touch inputs and the second set of touch inputs is detected by a one finger touch and the other of the first set of touch inputs is detected by plural finger touch.

18. The system of claim 17 wherein the instructions further cause:

presenting of a mouse cursor only at the main display; and controlling of movement of the mouse cursor with touches at the frame touch detection surfaces to make an input at the portion of the visual images of the privacy glasses with the mouse cursor seen through the first portion of the visual images.

19. The system of claim 18 wherein:

one finger touches are applied as the second set of touches; and two finger touches are applied as the first set of touches.

20. The system of claim 19 wherein the first set of touches comprises:

a first finger on a first parallel touch detection surface;

a second finger on a second parallel touch detection surface;

movement of the first and second fingers in a first direction to zoom only the glasses display visual image portion in; and movement of the first and second fingers in a second direction to zoom only the glasses display visual image portion out.

* * * * *